United States Patent
Ackel

(10) Patent No.: US 11,096,764 B2
(45) Date of Patent: Aug. 24, 2021

(54) DENTAL TRAY MOLDING KIT AND METHOD FOR DENTAL MOLDING

(71) Applicant: Gilbert Ackel, Côte-St-Luc (CA)

(72) Inventor: Gilbert Ackel, Côte-St-Luc (CA)

(*) Notice: Subject to any disclaimer, the term of this patent is extended or adjusted under 35 U.S.C. 154(b) by 536 days.

(21) Appl. No.: 15/792,468

(22) Filed: Oct. 24, 2017

(65) Prior Publication Data

US 2018/0110596 A1 Apr. 26, 2018

Related U.S. Application Data

(60) Provisional application No. 62/411,856, filed on Oct. 24, 2016, provisional application No. 62/427,261, filed on Nov. 29, 2016, provisional application No. 62/448,156, filed on Jan. 19, 2017.

(51) Int. Cl.
| | | |
|---|---|---|
| *A61C 9/00* | (2006.01) | |
| *A61C 19/06* | (2006.01) | |
| *A61C 7/08* | (2006.01) | |
| *A61C 19/00* | (2006.01) | |

(52) U.S. Cl.
CPC .......... *A61C 9/0006* (2013.01); *A61C 19/066* (2013.01); *A61C 7/08* (2013.01); *A61C 19/005* (2013.01); *A61C 19/063* (2013.01)

(58) Field of Classification Search
CPC ... A61C 9/0006; A61C 19/066; A61C 19/005; A61C 19/063; A61C 7/08
USPC .......................................................... 433/48
See application file for complete search history.

(56) References Cited

U.S. PATENT DOCUMENTS

| | | | | |
|---|---|---|---|---|
| 3,527,219 A | * | 9/1970 | Greenberg | A61K 6/20 |
| | | | | 433/25 |
| 4,867,680 A | * | 9/1989 | Hare | A61C 9/00 |
| | | | | 433/37 |
| 5,011,407 A | * | 4/1991 | Pelerin | A61K 6/90 |
| | | | | 433/48 |
| 5,203,351 A | | 4/1993 | Adell | |
| 5,213,498 A | | 5/1993 | Pelerin | |
| 5,566,684 A | * | 10/1996 | Wagner | A63B 71/085 |
| | | | | 128/861 |

(Continued)

FOREIGN PATENT DOCUMENTS

GB 2 329 341 A 3/1999

*Primary Examiner* — Matthew M Nelson
(74) *Attorney, Agent, or Firm* — Merchant & Gould P.C.

(57) ABSTRACT

A dental tray molding kit for making a custom dental tray includes a generic tray, a thermoformable member removably insertable into the generic tray and a deformable spacer member placeable onto the thermoformable material and bitable by the user upon placement of the spacer member onto the thermoformable member in the user's mouth. The generic tray may be a rigid carrier tray and the kit may include a partially deformable member placed between the rigid carrier tray and the thermoformable member. A method for dental tray molding includes providing a generic tray, heating a thermoformable member until sufficiently pliable, placing the thermoformable member over the generic tray, placing a deformable spacer member over the thermoformable member, applying a biting force from a user onto the thermoformable member through the deformable spacer member, cooling the thermoformable member and separating the thermoformable member, whereby the thermoformable member forms a custom dental tray.

21 Claims, 14 Drawing Sheets

(56) References Cited

U.S. PATENT DOCUMENTS

| | | | | |
|---|---|---|---|---|
| 5,616,027 A * | 4/1997 | Jacobs | ............... | A61C 9/0006 433/214 |
| 5,702,251 A * | 12/1997 | McClintock, II | .... | A61C 19/063 433/215 |
| 5,846,082 A * | 12/1998 | Thornton | ............... | B29C 43/18 433/215 |
| 7,305,990 B2 * | 12/2007 | Mathias | ............... | A61F 5/566 106/38.3 |
| 8,905,756 B2 * | 12/2014 | Schwartz | ............... | A61C 7/08 433/24 |
| 2004/0214140 A1 * | 10/2004 | Fischer | ............... | A61C 19/066 433/215 |
| 2006/0057541 A1 * | 3/2006 | Kahwaty | ............... | A61C 19/063 433/215 |
| 2007/0037116 A1 * | 2/2007 | Knutson | ............... | A61C 9/0006 433/68 |
| 2007/0166659 A1 * | 7/2007 | Haase | ............... | A61C 9/0006 433/37 |
| 2008/0233541 A1 * | 9/2008 | De Vreese | ........... | A61C 19/063 433/216 |
| 2009/0017422 A1 * | 1/2009 | Creamer | ............. | A61C 19/066 433/215 |
| 2010/0304325 A1 * | 12/2010 | Fletcher | ................ | A61C 19/05 433/71 |
| 2011/0129791 A1 * | 6/2011 | Rabinowitz | .......... | A61C 9/0006 433/37 |
| 2011/0247635 A1 * | 10/2011 | Jansheski | ............. | A61C 9/0006 128/862 |
| 2012/0219925 A1 * | 8/2012 | Tropmann | ........... | A61C 9/0006 433/37 |
| 2014/0023994 A1 * | 1/2014 | Zegarelli | ................ | A61C 19/08 433/216 |
| 2014/0053850 A1 * | 2/2014 | Podmore | ................ | A61C 13/12 128/848 |
| 2014/0287379 A1 * | 9/2014 | Chun | ................... | A61C 9/0006 433/42 |
| 2015/0059769 A1 * | 3/2015 | Powers | ................ | A41D 13/015 128/861 |
| 2016/0230007 A1 * | 8/2016 | Johnson | .............. | A61C 19/063 |
| 2016/0317108 A1 * | 11/2016 | Dekel | ..................... | A61B 6/12 |

* cited by examiner

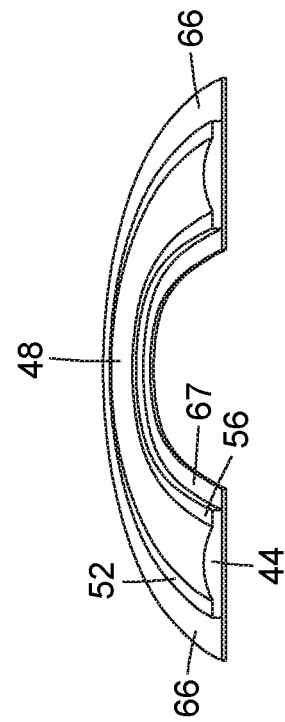
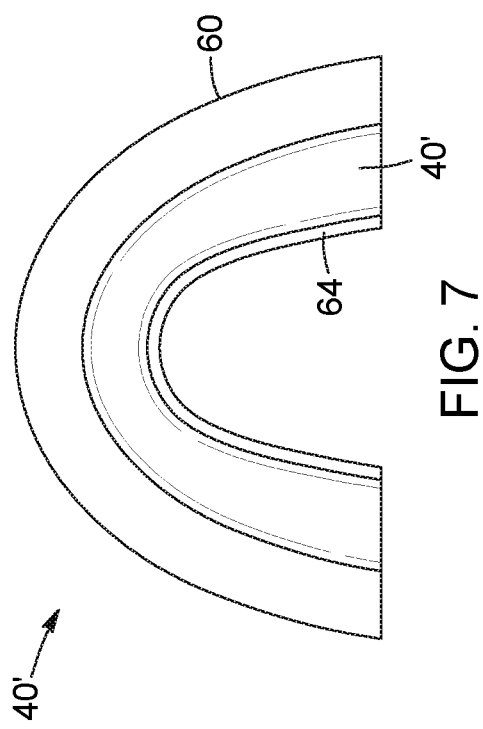
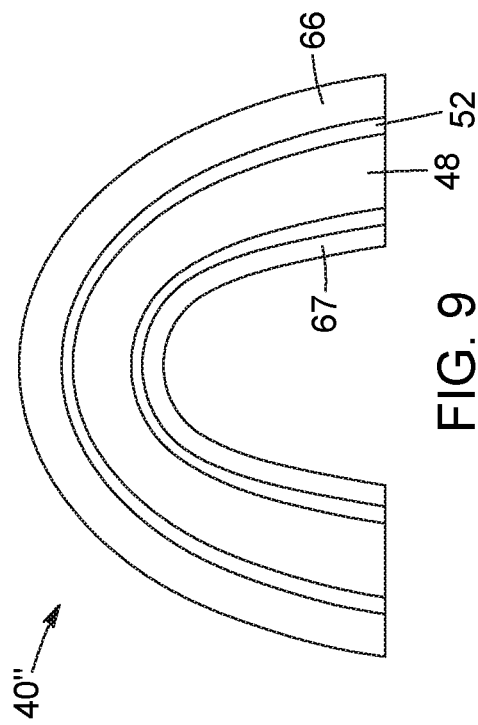

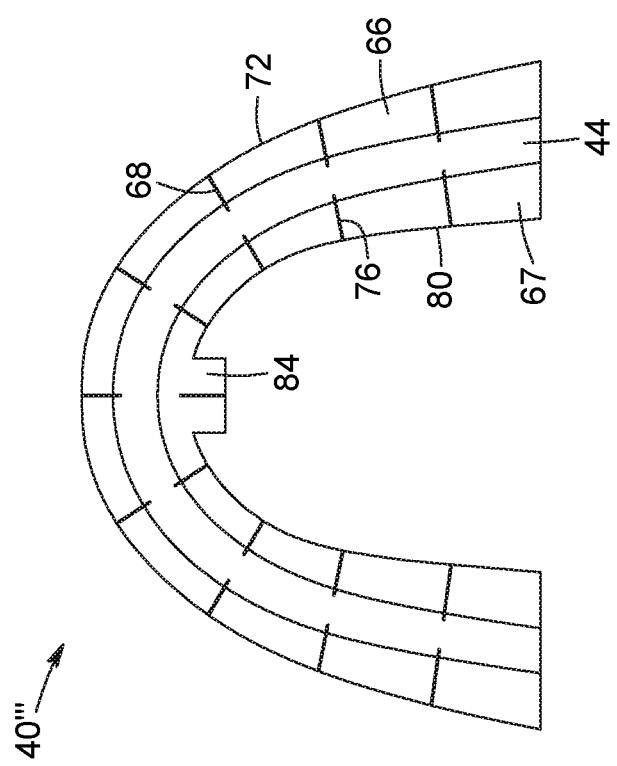

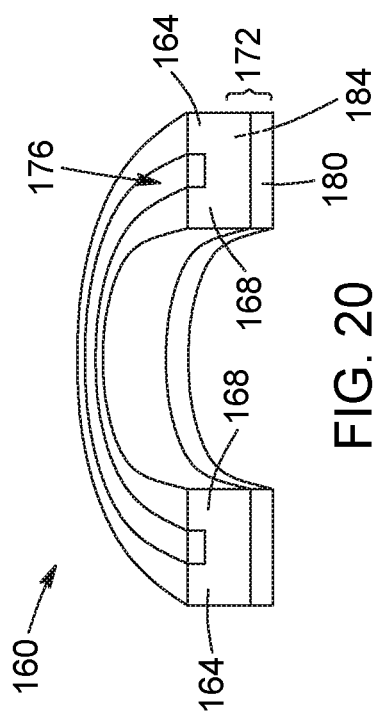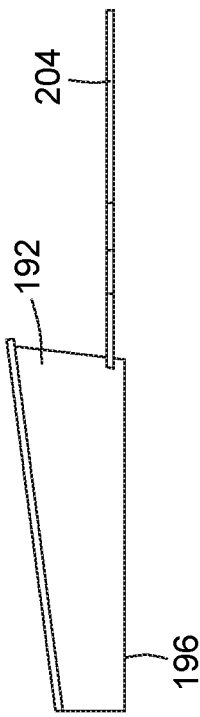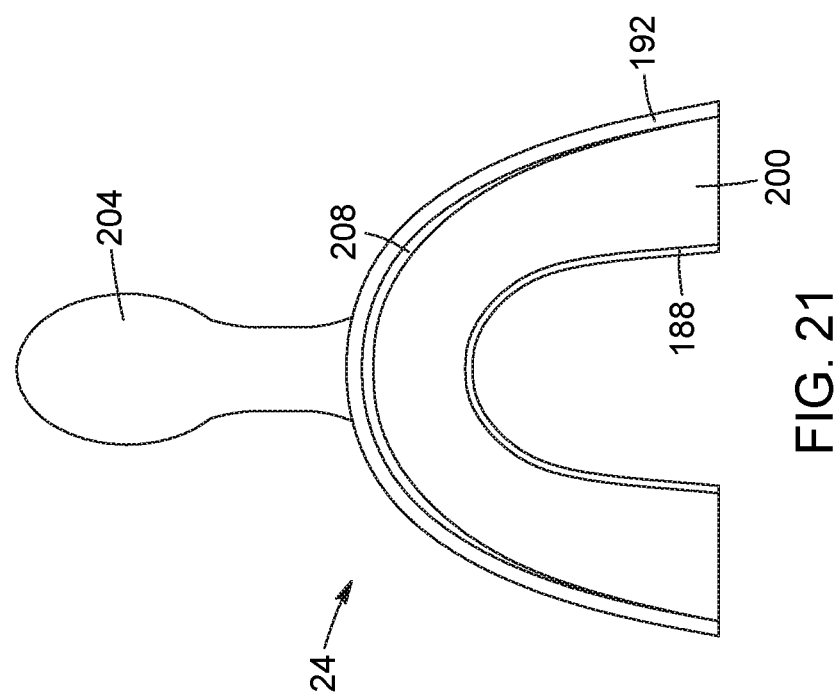

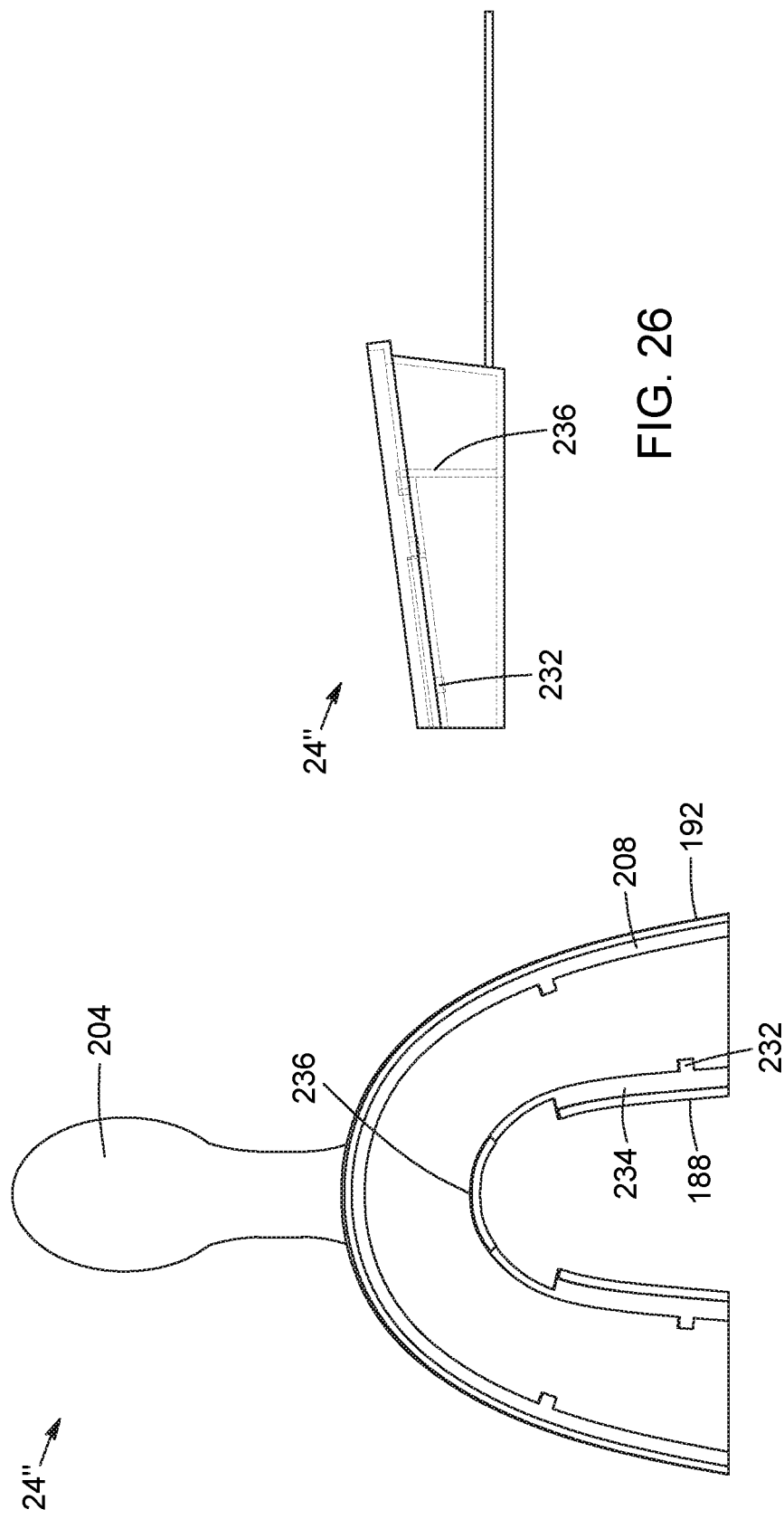

DENTAL TRAY MOLDING KIT AND METHOD FOR DENTAL MOLDING

RELATED PATENT APPLICATION

The present application claims priority from U.S. provisional patent application No. 62/411,856, filed Oct. 24, 2016, No. 62/427,261, filed Nov. 29, 2016 and 62/448,156, filed Jan. 19, 2017, the disclosures of which are hereby incorporated by reference in their entirety.

TECHNICAL FIELD

The present disclosure generally relates to a dental tray molding kit and method for forming a custom dental tray, and more particularly, a kit and method in which a spacer member and/or a partially deformable member is used in combination with a generic tray and a thermoformable member.

BACKGROUND

Many dental health care professionals, such as dentists, use dental tray molding techniques for various dental procedures.

In certain cases, molding a dental tray can be indispensable. However, techniques known in the art fail to provide a thin, durable, mouldable tray that is as close as possible to a dental laboratory fabricated tray. Known techniques are generally time-consuming to produce as they require sending dental impressions to a dental laboratory. Some trays are also too bulky and are poorly fitted to patients' teeth. These bulky trays are also easily noticed which can make certain patients uncomfortable. Additionally, bulky trays can be quite problematic in procedures requiring the use of gels, as bulky trays are often also poorly fitted. In these events, the poorly fitted trays allow the gels to leak out which can render the procedure less efficient. Poorly fitted trays are also poorly adapted for holding onto a patient's teeth and can be quite uncomfortable and inconvenient for the patient.

Some trays do not permit an appropriate retention of the dental tray molding kit into the mouth of the user. For instance, some trays do not allow maintaining an optimal compression onto the teeth, which may result in a suboptimal dental impression. In other cases, the trays may apply too much pressure on soft tissues of the mouth, which is both uncomfortable and may even damage the soft tissues of the mouth.

There therefore exists a need in the art for dental tray molding methods and kits which alleviate at least some of the drawbacks of the prior art.

SUMMARY

According to one aspect, there is provided a dental tray molding kit for making a custom dental tray. The kit includes a generic tray, a thermoformable member removably insertable in the generic tray, and a deformable spacer member placeable onto the thermoformable material and bitable by the user upon placement of the spacer member onto the thermoformable member in the mouth of the user.

According to another aspect, a dental tray molding method includes providing a generic tray, submerging a thermoformable member in a recipient of hot water until the thermoformable member is sufficiently pliable, placing the thermoformable member over the generic tray, placing a deformable spacer member over the thermoformable member, applying a biting force from a user onto the thermoformable member through the deformable spacer member, cooling the thermoformable member within a mouth of the user, and separating the thermoformable member from the spacer member and the generic tray, whereby the cooled thermoformable member forms a custom dental tray for the user.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 7 illustrates a plan view of the spacer member according to a first alternative embodiment;

FIG. 8 illustrates a front elevation view of the spacer member according to the first alternative embodiment;

FIG. 9 illustrates a plan view of a spacer member according to a second alternative example embodiment;

FIG. 10 illustrates a front perspective view of the spacer member according to the second alternative example embodiment;

FIG. 11 illustrates a plan view of a spacer member according a third alternative example embodiment;

FIG. 20 illustrates a front perspective view of a partially deformable member according to an example embodiment;

FIG. 21 illustrates plan view of a carrier tray according to an example embodiment;

FIG. 22 illustrates a plan view of the carrier tray according to the example embodiment;

FIG. 25 illustrates a plan view of a carrier tray according to an alternative example embodiment;

FIG. 26 illustrates a side elevation view of the carrier tray according to the alternative example embodiment.

Figure 1:
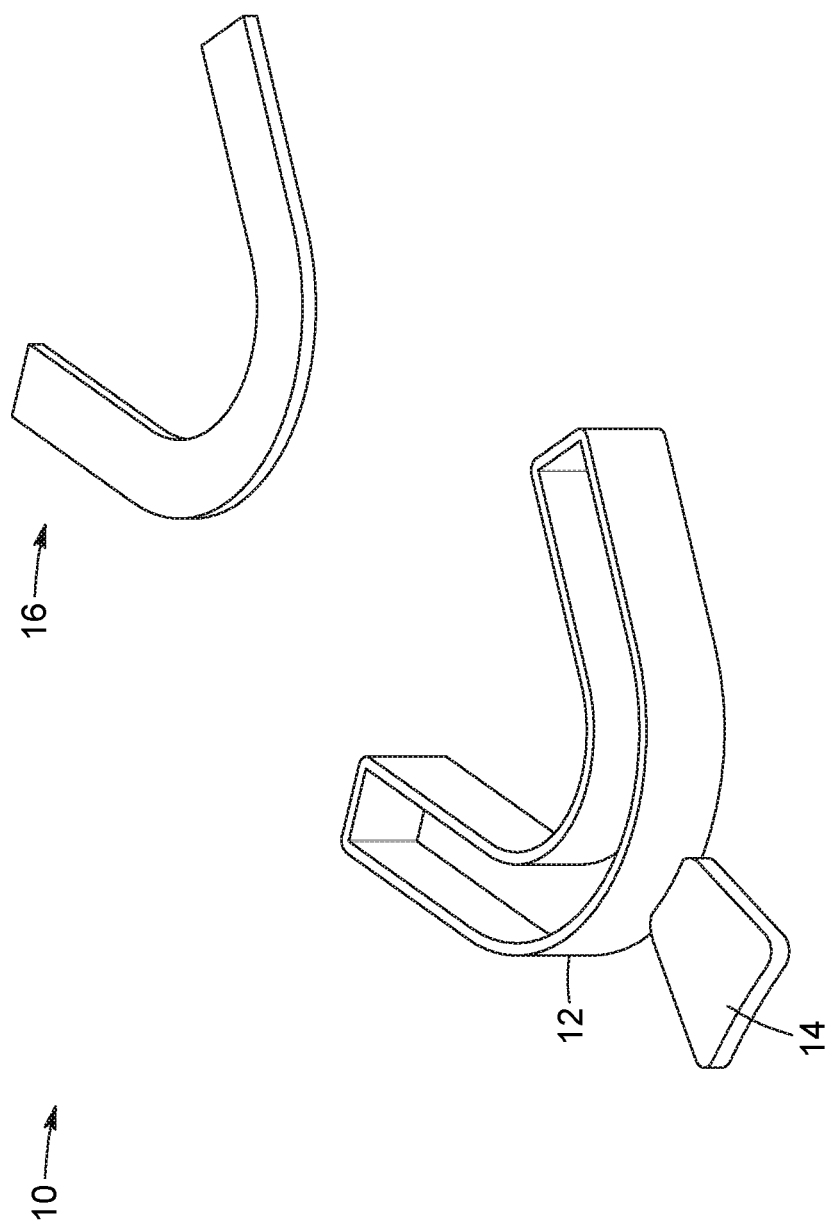
FIG. 1 illustrates an embodiment of a dental tray molding kit having a moldable generic tray.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

Moreover, it will be appreciated that positional descriptions such as "top", "bottom", "under", "upper", "lower", "left", "right", "vertical", "horizontal", "front" and "rear" and the like, should, unless otherwise indicated, be taken in the context of the figures and should not be considered limiting.

As used herein, the expression "dental tray", also often referred to as a "dental impression tray" is intended to refer to a receptacle or device that can be used to carry impression material to the mouth, confine the material in opposition to the surfaces to be recorded, and control the impression material while it sets to form the impression.

As used herein, the expression "custom dental tray" is intended to refer to the result of applying a dental tray to teeth, thus producing a tray including an impression of the teeth on which the dental tray was applied.

As used herein, the expression "generic tray" is intended to refer to a generic dental tray for creating teeth impressions. As explained hereinbelow, the generic tray can either be a moldable generic tray that can form a custom impression tray, or the generic tray can alternately be a rigid generic tray that requires the additional use of impression material in order to be able to produce a custom impression tray.

As used herein, the expression "thermoformable material" is intended to refer to a material that can be manufactured using a thermoforming process, in which plastic can be heated to a pliable forming temperature, formed to a specific shape in a mold and trimmed to create a usable product.

As used herein, the expression "impression material" is intended to refer to a material that can be used in various areas of dentistry that is capable of receiving a dental impression and the area that the impression material covers.

In accordance with some embodiments, there is provided a dental tray molding kit having a spacer.

Referring to FIG. 1, there is shown an embodiment of the dental tray molding kit 10 using a moldable generic tray 12. The moldable generic tray 12 is generally of a horseshoe shape with an open U-shaped cross-section. In some embodiments, the moldable generic tray 12 can have a handgrip 14 protruding from the moldable generic tray 12 to assist with handling. Preferably, the moldable generic tray 12 is made of an ethylene vinyl-acetate material. The moldable generic tray 12 is also typically sufficiently pliable to be used as an impression material and can make an accurate impression if no spacer is used.

Depending on the user's dental development, the moldable generic tray 12 can also be sized to conform to the user's primary or permanent teeth.

The kit 10 also includes a thermoformable material 16 removably insertable in the moldable generic tray 12 and bitable by the user upon placement of the thermoformable material 16 inserted into the moldable generic tray 12 in the mouth of the user. In some embodiments, the thermoformable material 16 can be of a flat horseshoe shape or a cylindrical shape. Thermoformable material 16 may be thermoplastic material. Preferably, the thermoplastic material is a polyester material. The polyester material can be derived from a caprolactone monomer with a monomer content of about 0.5% Max, a water content of about 0.35% Max, a mean molecular weight of about 80 000, a melting point of about 58° C. to 60° C., an elongation at break of between about 500% to 800%, a bending modulus of 280 MPa, a tensile strength of about 23 MPa and/or a melt index about 3 to 5 g/10 min (160° C.). The thermoformable material is also typically sufficiently pliable for to be used as an impression material and can make an accurate impression if no spacer is used. In one preferred embodiment of the present invention, the thermoplastic material is polycaprolactone, similar to the material used as a thermosetting material in U.S. Pat. No. 5,213,498.

According to another embodiment of the invention, there is provided a dental tray molding kit, including a rigid generic tray; an impression material removably insertable in the rigid generic tray and bitable by a user upon placement of the impression material inserted into the rigid generic tray in a mouth of the user to create a custom impression tray; and a thermoformable material removably insertable in the custom impression tray and bitable by the user upon placement of the thermoformable material inserted into the custom impression tray in the mouth. A spacer can be used with one of the impression material or the thermoformable material.

Figure 2:
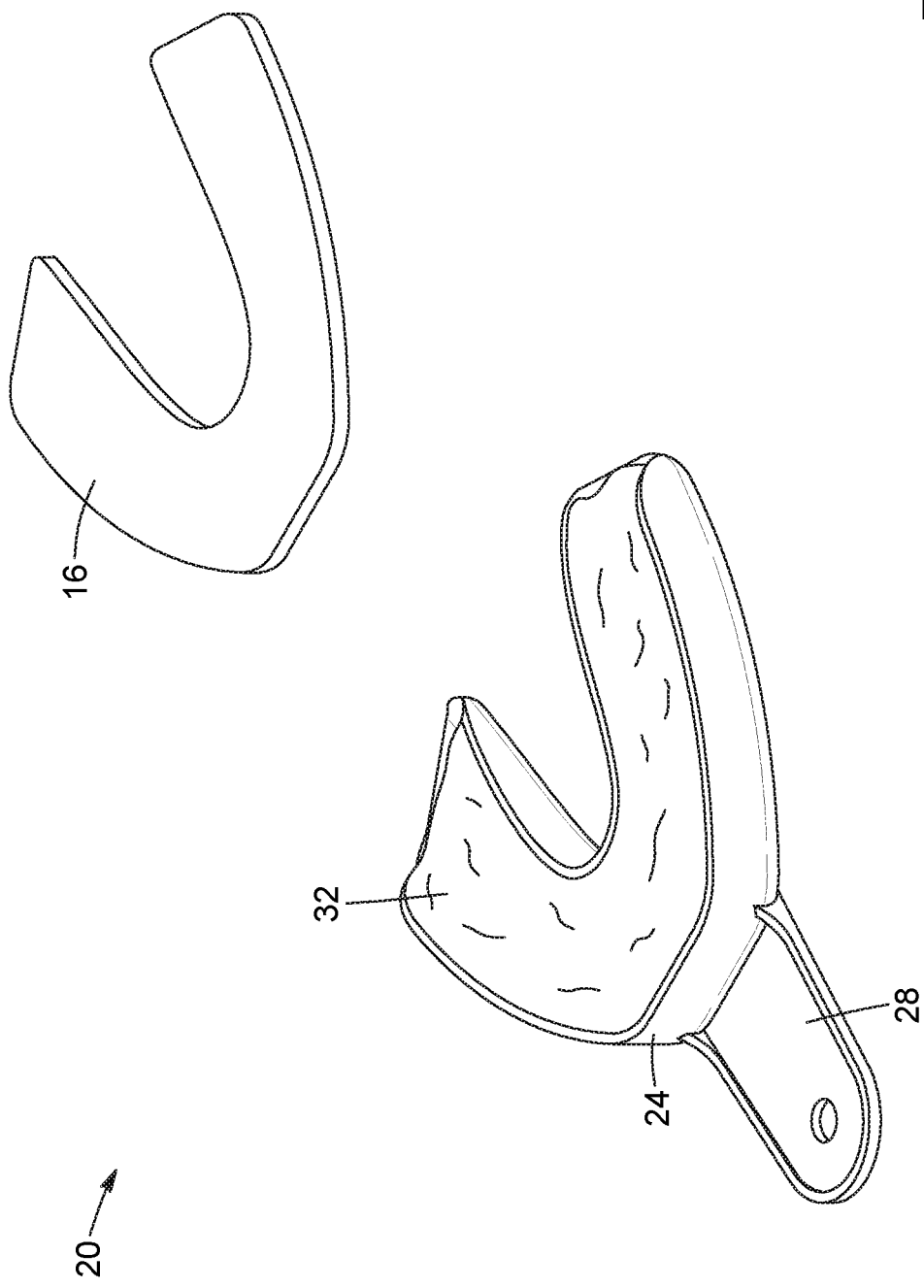
FIG. 2 illustrates an embodiment of a dental tray molding kit having a rigid generic tray.

Referring now to FIG. 2, there is shown an alternative embodiment of the dental tray molding kit 20. The kit 20 includes a rigid generic tray 24. In some embodiments, the rigid generic tray 24 can have a handgrip 28 protruding from the generic tray 24 to assist with handling. Preferably, the rigid generic tray 24 is made of plastic or metal.

Depending on the user's dental development, the rigid generic tray 24 can also be sized to conform to the user's primary or permanent teeth.

The kit 20 also includes an impression material 32 removably insertable in the rigid generic tray 24 and bitable by a user upon placement of the impression material 32 inserted into the rigid generic tray 24 in a mouth of the user to create a custom impression tray. Preferably, the impression material 32 is obtained by mixing a putty base with a catalyst for about 30 to 45 seconds. The impression material 32 can be made of a polyether, a polysulfide, a hydrocolloid, a polyvinyl, a vinyl-polyether hydride, a condensation cured silicone or an addition silicone. The addition silicone can be a siloxane, a polysiloxane or a polyvinyl siloxane. A spacer can be provided over the impression material.

The kit 20 also includes a thermoformable material 16 removably insertable in the custom impression tray and bitable by the user upon placement of the thermoformable material 16 inserted into the custom impression tray in the mouth. Preferably, the thermoformable material 16 is a thermoplastic material. Also preferably, the thermoplastic material is a polyester material. The thermoformable material 16 of kit 20 has the same characteristics as the thermoformable material 16 described herein with reference to kit 10.

Figure 3:
FIG. 3 illustrates a plan view of a thermoformable member according to one example embodiment.
Figure 4:
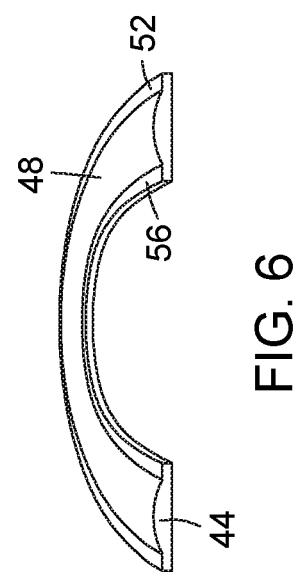
FIG. 4 illustrates a front elevation view of the thermoformable member according to example embodiment.

Referring to FIGS. 3 and 4, therein illustrated is a plan view and a front elevation view, respectively, of the thermoformable member 16 according to one example embodiment. In this embodiment, the thermoformable member 16 is formed of a thermoplastic material, which may be the same material as described herein with respect to kit 10 and 20 of FIGS. 1 and 2. As illustrated, the thermoformable member 16 has a substantially planar horseshoe shape. According to one example embodiment, the thermoformable member 16 consists essentially of the thermoplastic material.

According to another alternative example embodiment, the thermoformable member 16 includes a thermoplastic sub-member formed of the thermoplastic material described herein. The thermoplastic sub-member defines a top surface and a bottom surface opposite the first surface. The thermoformable member 16 further includes a first protective member covering the top surface of the thermoplastic sub-member and a second protective member covering the bottom surface of the thermoplastic sub-member.

One or both of the first and second protective members may be substantially resistant to piercing from application of a biting force from teeth of the user. Both the first and second protective members may be film members and may be formed of the same or different materials.

For example, the first protective film member covering the top surface of the thermoplastic sub-member is formed of a polyvinylidene chloride material, such as Saran™ wrap. The first protective film member may be pre-fused to the thermoplastic sub-member or may become fused from an application of heat. The first protective film may be a sticky type of film.

For example, the second protective film member covering the bottom surface of the thermoplastic sub-member is formed of one of flexible film, plastic, polymer and fabric. The second protective film may be more rigid than the first protective film member.

According to one example embodiment, the first protective film member has the same thickness as the second protective film member. Alternatively, the second protective film member may be thicker and more resistant than the first protective film member.

Figure 5:
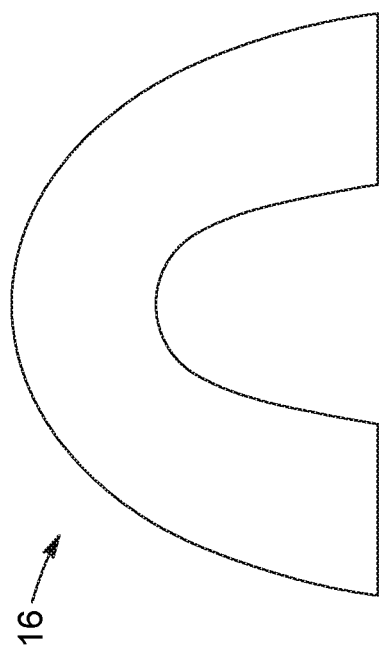
FIG. 5 illustrates a plan view of a spacer member according to a first example embodiment.
Figure 6:
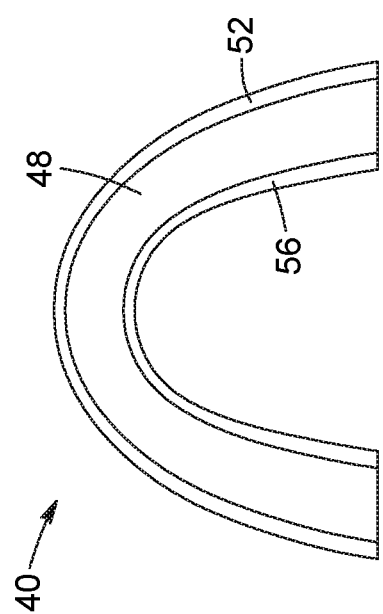
FIG. 6 illustrates a front perspective view of the spacer member according to the example embodiment.

Referring now to FIGS. 5 and 6, therein illustrated is a plan view and a front perspective view of an embodiment of a spacer member 40. The spacer member 40 is an element of the dental molding kits described herein, such as dental molding kit 10 or dental molding kit 20.

The spacer member 40 comprises a body portion 44 formed of a resilient material. The body portion 44 has a sufficient thickness to receive the teeth of a user. The horseshoe shape of the body portion 44 allows substantially following and/or matching the disposition of the teeth in the mouth of the user. The body portion 44 can be a resilient material that can be changed from an original state to a deformed state upon maintenance of a force by the mouth of the user. The resilient material of the body portion 44 can also be changed from the deformed state back to the original state after release of the force by the mouth of the user. In the illustrated embodiment, the resilient material of the body 44 is formed of foam. Alternatively, the material of the body portion 44 can also comprise an elastic material, a shape-memory material, or a compressible material. For instance, the body portion 44 can further comprise material selected from the group of comprising foam, foam rubber, cloth skin, gel, combinations thereof, or the like.

According to various example embodiments in which the body portion 44 of the spacer member 40 is formed of a foam material, the foam space member is adapted to introduce air into a space between the teeth and the thermoplastic material of the thermoformable member 16. This reduces a suction force being applied toward the thermoformable member that would have caused the thermoformable material to be pulled towards the teeth. Reduction of the suction force provides easier application of the pumping action of the teeth and reduces the likelihood of the thermoplastic material of the thermoformable member being pulled towards the teeth that would make the thermoplastic material difficult to remove.

In the example illustrated in FIGS. 5 and 6 the spacer member 40 is wholly formed of the body portion 44. The spacer member 40 includes a central portion 48 extending over the horseshoe length of the spacer member 40. The spacer member 40 also includes side portions 52, 56 that extend on either side of the central portion 48. The central portion 48 has a thickness that is significantly greater than the thicknesses of side portions 52, 56. For example, and as illustrated, the central portion 48 has a semi-circular cross-section. In use, the central portion 48 is to be aligned with the row of teeth of the user for whom the dental mold is to be formed.

Referring now to FIGS. 7 and 8, therein illustrated is a plan view and front perspective view of a spacer member 40' according to an alternative example embodiment. The spacer member 40' includes an alternative body portion 44' formed of the resilient material described herein with reference to FIGS. 5 and 6. The body portion 44' has a substantially rectangular cross-section, as seen in FIG. 8. The spacer member 40' further includes a first protective layer covering a top surface of the body portion 44' and a second protective layer covering a bottom surface of the body portion 44'. The first and second protective layers extend beyond an outer edge of the body portion 44', whereat the two protective layers are bonded together to form a first outer trim 60. The first and second protective layers also extend beyond an inner edge of the body portion 44', whereat the two protective layers are bonded together to form a second outer trim 64. Accordingly, the protective layers cover the top and bottom surfaces of the body portion 44'.

Referring now to FIGS. 9 and 10, therein illustrated is a plan view and front perspective view of a spacer member 40" according to a second alternative example embodiment. The spacer member 40" includes the body portion 44 formed of the resilient material as described herein with reference to FIGS. 5 and 6. The spacer member 40" further includes a first protective layer covering a top surface of the body portion 44 and a second protective layer covering a bottom surface of the body portion 44. The first and second protective layers extend beyond an outer edge of the first side portion 52, whereat the two protective layers are bonded together to form a first outer trim 66. The first and second protective layers also extend beyond an inner edge of the second side portion 56, whereat the two protective layers are bonded together to form a second outer trim 67. Accordingly, the protective layers cover the top and bottom surfaces of the body portion 44.

Referring now to FIG. 11, therein illustrated is a plan view of a spacer member 40''' according to a third alternative example embodiment. The spacer member 40'' includes the body member 44 described herein with reference to FIGS. 5 and 6 and the top and bottom layers forming the outer trims 66, 67 as described herein with reference to FIGS. 9 and 10. The outer trim 60 of the spacer member 40''' has a plurality of slits 68 extending radially from an outer edge 72 of the outer trim 66. Similarly, the inner trim 67 of the spacer member 44''' has a plurality of slits 76 extending radially from an inner edge 80 of the trim 67. The slits 68 and 76 provide additional flexibility to the top and bottom protective layers. Accordingly, the protective layers can be flexed under a biting action from a user to follow the deformation of the outer surfaces of the body portion 44 formed of the resilient material.

Continuing with FIG. 9, the inner trim 60 further includes a tab 84 extending from the inner edge 80 at an apex of the spacer member 40'''. As described hereinbelow, the tab 84 cooperates with the thermoformable member 16 during operation of the dental molding kit.

The top and bottom protective layers of the spacer member 40' (or spacer member 40'', 44''') may be formed of flexible film, plastic, polymer, fabric, or the like. Furthermore, the top and bottom protective layers can be bonded to the body portion 44 (or body portion 44') and to each other using a suitable bonding material. Alternatively, the top and bottom protective layers can loosely cover the body portion 44 (or body portion 44') while being bonded to one another at outer trims 60, 64 (or 66, 67). The protective layers are formed of a material that is substantially resistant to piercing from application of a biting force from the teeth of the user.

According to various example embodiments, the spacer member 44 (or alternative spacers 44', 44'' or 44''') is reusable, meaning that it can be used several times without altering its main components and features.

The spacer member 44 (or alternative spacers 44', 44'' or 44'''), can be removably placed over the thermoformable material 16 and can be placed into the mouth of the user. The spacer member 44 can thus be bitten by the user upon placement of the spacer 44 onto the thermoformable material 16 in the mouth of the user. The user applies a biting force onto the thermoformable material 16 through the spacer member 44. The spacer member 44 therefore acts an intermediate member between the user's teeth and the thermoformable material 16. Accordingly, the user's teeth do not need to directly contact the thermoformable material 16, thereby softening the feel for the user while making the dental impression.

Figure 12:
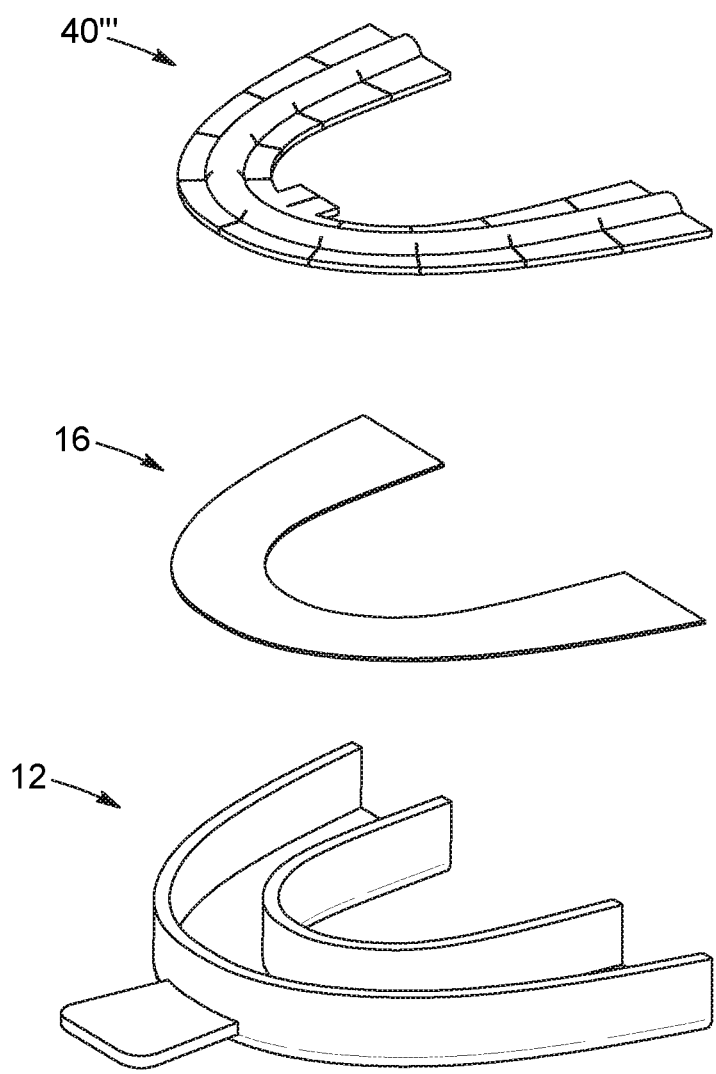
FIG. 12 illustrates an exploded view of the dental tray kit according to an example embodiment for use for forming a custom dental tray.

Referring now to FIG. 12, therein illustrated is an exploded view of the dental tray kit 10 for use for forming a custom dental tray. In the illustrated example, the dental tray kit 10 includes the moldable generic tray 12, the thermoformable member 16 and the spacer 40'''. It will be appreciated that the rigid generic tray 20 with the impression material 32 may be used in place of the moldable generic tray 12. The placement of the generic tray 12, thermoformable member 16, and spacer member 40 corresponds to the proper placement of these elements during use.

According to a method for using the dental tray kit 10 having a spacer member 44 (or alternative spacers 44', 44'' or 44'''), a recipient of hot water sized to receive the moldable generic tray 12 is provided. Preferably, the hot water is boiling water or is at least at a temperature for softening the moldable generic tray 12. The method also includes submerging 24 the moldable generic tray 12 into the boiling water until the moldable generic is sufficiently pliable, and inserting the moldable generic tray 12 into the mouth of the user. The method further includes biting the moldable generic tray 12 to form a custom impression tray.

The method also includes submerging the thermoformable member 16 in a recipient of hot water until the thermoformable member is sufficiently pliable.

The method further includes placing the thermoformable member 16 (once sufficiently pliable) over the custom impression tray and placing the spacer member 44 (or alternative spacer 44', 44'' or 44''') over the thermoformable member. The method further includes the user applying a biting force into the thermoformable member 16 and the moldable generic tray 12 through the spacer member 44 to form a custom dental tray. The method can include biting the thermoformable material 16 using a pumping action to create the custom dental tray. The pumping action can be produced by the user using an up and down pumping action with the user's teeth until the thermoformable material 16 hardens within the user's mouth. The moldable generic tray 12, the thermoformable member 16, and the spacer member 44 are then removed from the user's mouth and the spacer member 44 is then removed (for example, for use again).

The method can also include cooling the thermoformable member 16 in the mouth. In some embodiments, the method can further include a step of cooling the thermoformable member 16 by submerging in cold or ice water to set. However, most, if not all cooling should occur in the mouth to avoid distortion.

The method can include a step of applying orthodontic wax, petroleum jelly or a suitable material on and between the user's teeth to block embrasures, undercuts and black triangle. As used herein, the expression "black triangle" is intended to refer to spaces or embrasures between teeth that are not blocked by gingival papillae. The step of applying orthodontic wax can prevent complications from the thermoformable material hardening in spaces between teeth and thus difficult to retrieve.

The method can include separating the custom dental tray from the custom impression tray and optionally, trimming excess thermoformable material from the custom dental tray. Generally, trimming can be performed using a knife, scissors or a razor blade.

The method of using the dental molding kit to form the custom dental tray can also be performed using the dental molding kit 20 according to the alternative embodiment. The impression material 32 is placed within the generic tray 24 and the user bites into the impression material 32 to form the custom impression tray. The remainder of the steps of the method to form the custom dental tray from the dental molding kit corresponds substantially to the method described hereinabove for molding kit 10.

Preferably, the kit 10 is configurable to whiten teeth of the user as a cosmetic procedure.

Advantageously, the dental tray molding method according to embodiments described herein allows for holding the thermoformable material in place while creating the custom dental tray and allows for easy manipulation of the thermoformable material for creating a thin, durable custom dental tray having a precise dental fit.

Also advantageously, the dental tray molding method according to embodiments described herein can be easily fabricated in a few minutes without having to send dental impression to a laboratory. The custom dental tray created is also generally thin and aesthetic and is not as noticeable as bulky dental trays. It is also well adapted to hold onto a user's teeth without requiring support or additional handling.

Furthermore, advantageously, the use of the spacer member 40 (or alternative spacer members 40', 40", or 40''') provides improved comfort to the user during use. The spacer member 40 acts as a buffer, so that the user's teeth are not directly in contact with the thermoformable material. Otherwise, without the spacer member, the thermoformable member can directly contact the gums and teeth of the user, which can cause discomfort. The spacer member 40 also facilitate the pumping action by the user when forming the custom dental tray. Furthermore, the spacer member 40 acts to soften the sharp incisal edges. This can be useful to restrict piercing of other elements of the dental molding kit, such as the thermoformable member 16.

In some implementations, the dental molding kit may include a plurality of spacers. A first spacer may be a thin plastic sheet to be place over the EVA generic tray. A second spacer may be the spacer member 40 (or alternative spacer members 40', 40", or 40''') described herein according to various example embodiments.

The dental molding kit 10 or 20 can further include instructions describing the method of use for forming the custom dental tray.

Figure 14:
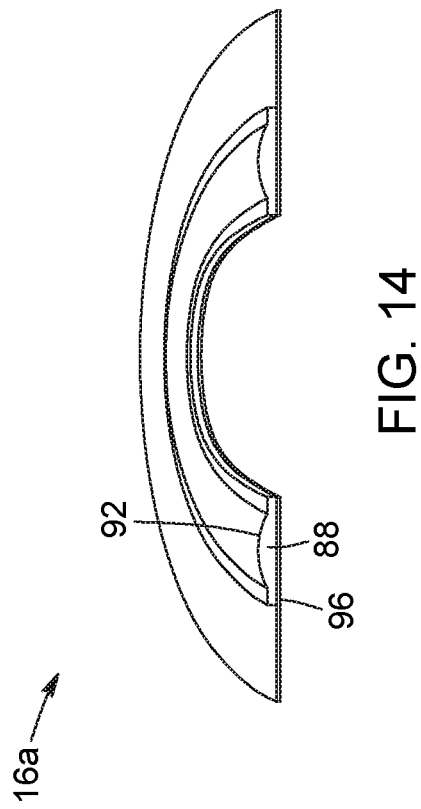
FIG. 14 illustrates a front perspective view of the thermoformable member according to the first alternative example embodiment.
Figure 13:
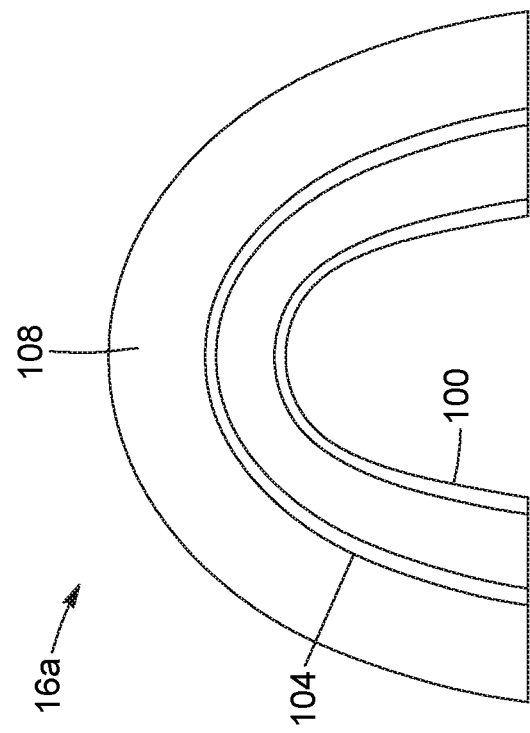
FIG. 13 illustrates a plan view of a thermoformable member according to a first alternative example embodiment.

Referring now to FIGS. 13 and 14, therein illustrated are a plan view and a front perspective view, respectively, of a thermoformable member 16a according to an alternative example embodiment. The thermoformable member 16a includes a thermoplastic sub-member 88 that is sandwiched between a first protective member 92 covering an upper surface of the sub-member 88 and a second protective member 96 covering a bottom surface of the sub-member 88.

According to one example embodiment, and as illustrated, the thermoplastic sub-member 88 has a horseshoe shape defining an inner edge 100 and an outer edge 104. The horseshoe shape of the thermoplastic sub-member allows substantially following and/or matching the disposition of the teeth in the mouth of the user. In this perspective, the shape of the thermoplastic sub-member 88 may vary according to the disposition of the teeth of the user.

For example, and as illustrated in FIG. 14, the thermoplastic sub-member 88 has a central portion 88 having a semi-circular cross-section and planar portions extending laterally from the central portion 88.

A portion 108 of the second protective member 96 may extend outwardly from the outer edge 104 of the thermoplastic sub-member 88 while a central portion of the protective member 96 covers the lower surface of the thermoplastic sub-member 88. The outwardly extending portion of the second protective member 96 can facilitate manipulation of the thermoformable member 16a. For example, the thermoplastic sub-member 88 may be submerged into water to begin forming the thermoplastic sub-member 88 while the extending portion 108 of the second protective member 96 is held outside the water. Furthermore, the second protective member 96 may be more rigid than the thermoplastic sub-member 88 so as assist in maintaining the horseshoe shape of the thermoplastic sub-member 88, even when heated.

The first and second protective layers 92, 96 cooperate to restrict lateral flow (ex: in directions of inner and outer edges 100, 104) of the thermoplastic sub-member 88 when the thermoplastic material is heated and biting pressured is applied thereon. Restricting this flow can reduce the excess material that needs to be cut from the custom dental tray that is formed.

Figure 15:
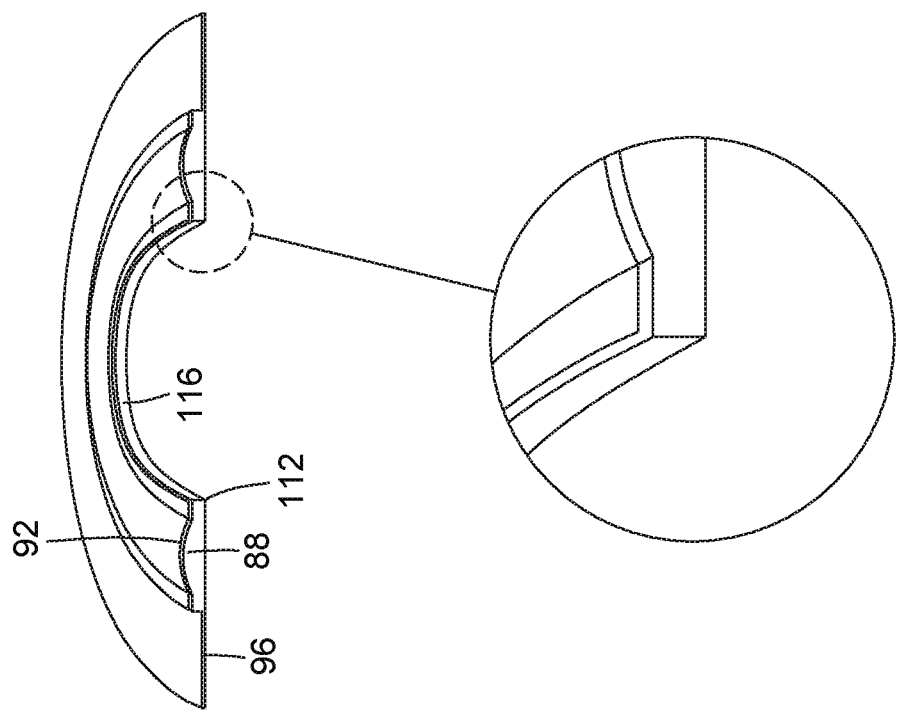
FIG. 15 illustrates a front perspective view of the thermoformable member according to a second alternative example embodiment.

According to another alternative embodiment, and as illustrated in FIG. 15, the thermoplastic sub-member 16b has an inner sidewall 112 extending along the inner edge 100 and between first and second surfaces. Accordingly, a third protective member 116 further extends over and covers the inner sidewall 112.

The third protective member 116 may be integrally formed with the first protective member 92 and/or the second protective member 96. The third protective member 116 may cooperate with one or both of the first protective member 92 and the second protective member 96 to restrict flow of the thermoplastic material of the thermoplastic sub-member 88 in the direction of the inner edge 100.

Figure 16:
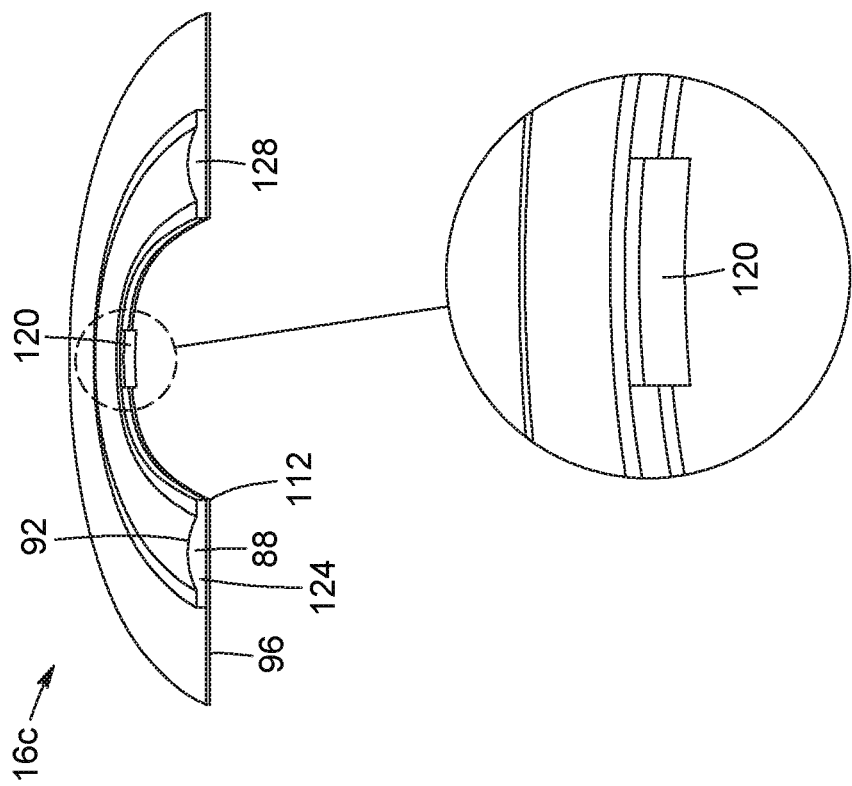
FIG. 16 illustrates a front perspective view of the thermoformable member according to the third alternative example embodiment.

Referring now to FIG. 16, therein illustrated is yet another alternative example embodiment 16c of the thermoformable member. In such embodiments, a central portion 120 of the inner sidewall 112 that corresponds to an apex of the inner edge 100 of the horseshoe shape is covered with a protective member while end portions 124 of the inner sidewall 128 are exposed.

In one example embodiment, the first protective member 92 is formed of a polyvinylidene chloride material and the second protective member 96 is formed of one of flexible film, plastic, polymer and fabric. Furthermore, the protective member covering the central portion 120 is formed of the same material as the first protective member 92.

In another example embodiment, the first protective member 92 is formed of a polyvinylidene chloride material and the second protective member 96 is formed of one of flexible film, plastic, polymer and fabric. Furthermore, the protective member covering the central portion 120 is formed of the same material as the second protective member 96.

In yet another example embodiment, the first protective member 92 covering the upper surface of the thermoplastic member 88, the second protective member 96 covering the thermoplastic member 88 and the protective member covering the central portion 120 are all formed of the same material, such as flexible film, plastic, polymer and/or fabric.

In use, the protective member covering the central portion 120 of the inner sidewall 112 operates to restrict flow of thermoplastic material through the apex the horseshoe while allowing or promoting flow of material from the end portions 120, 128. This can result in a custom dental tray being formed in which the excess thermoplastic material is easier to cut away.

Figure 17:
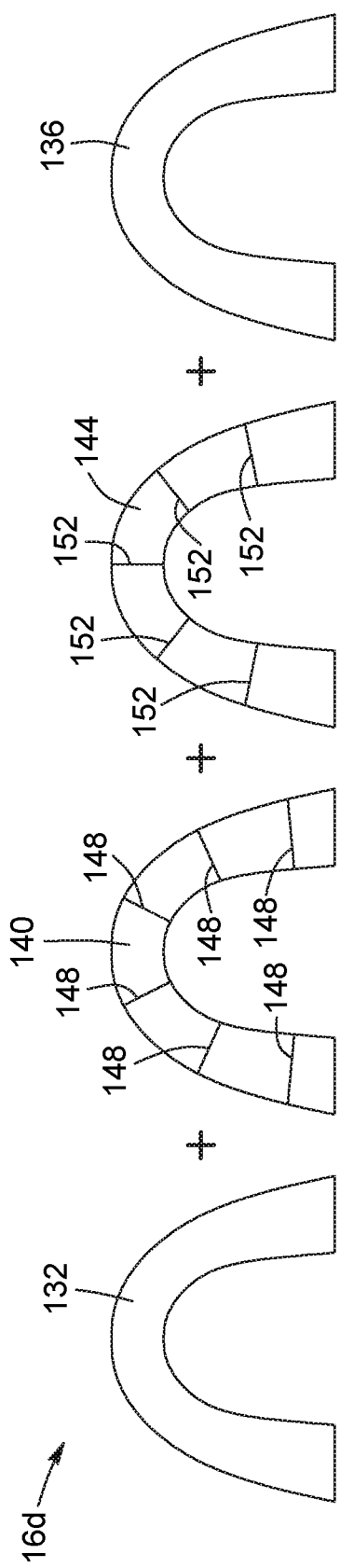
FIG. 17 illustrates an exploded view of a thermoformable member according to a fourth alternative example embodiment.
Figure 18:
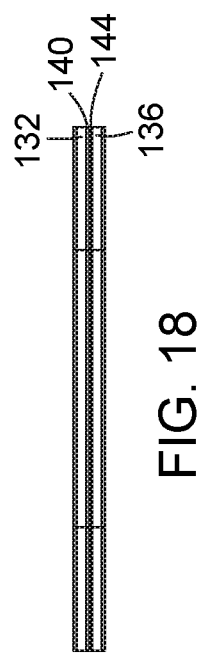
FIG. 18 illustrates a front elevation view of the thermoformable member according to the fourth alternative example embodiment.

Referring now to FIGS. 17 and 18, therein illustrated is an exploded view and front elevation view, respectively, of a thermoformable member 16d according to an alternative example embodiment. The thermoformable member 16d includes a first sub-layer 132 formed a thermoformable material and a second sub-layer 136 also formed of a thermoformable material. The first and second sub-layers 132, 136 may be formed of a material described herein with reference to thermoformable material 16. The thermoformable member 16d further includes a first film sublayer 140 and a second film sublayer 144.

The first and second film sublayers 140, 144 can be formed of a material that is resistant to piercing from application of biting force from teeth of a user. For example, the first and second film sublayers 140, 144 can be formed flexible film, plastic, polymer, fabric, or the like, as described herein with reference to protective layers of the spacer member 40.

A first set of cuts or slits 148 are formed in the first film sub-layer 140. The first set of slits 148 provide additional flexibility to the first sub-layer 132.

Similarly, a second set of cuts or slits 152 are formed in the second film sub-layer 144. The second set of slits 152 provide additional flexibility to the second sub-layer 144. The first set of slits 148 are offset from the second set of slits 152.

The first thermoformable sub-layer 132, the first film sublayer 140, the second film sublayer 144, and the second thermoformable sub-layer 136 are stacked one atop another within the thermoformable member 16*d*, as illustrated in FIG. 18. More particularly, the first and second film sublayers 140, 144 are sandwiched between the first and second thermoformable sub-layers 132, 136.

The first and second film sub-layers 140, 144 provide a barrier between the two thermoformable sub-layers 132, 136 so that the two thermoformable sub-layers 132, 136 deform independently under biting pressure from a user.

A first protective layer may be disposed over a top surface of the first thermoformable sublayer 132 and a second protective layer may be disposed over a bottom surface of the second thermoformable sublayer 136. The protective layers cause the thermoformable member 16*d* to be resistant from piercing by the user's teeth.

Figure 19:
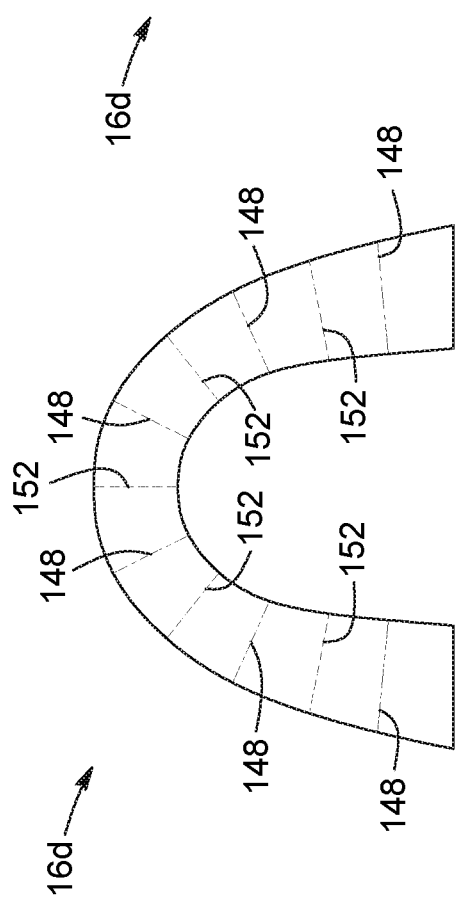
FIG. 19 illustrates a plan view of the thermoformable member according to the fourth alternative example embodiment.

FIG. 19 illustrates a plan view of the multilayer thermoformable member 16*d* showing the slits 148, 152 of the first and second film sub-layers 140, 144.

Referring now to FIG. 20, therein illustrated is a front perspective view of a partially deformable member 160. The partially deformable member 160 may be used in place of the impression material 32 within the dental mold kit having the carrier tray 24. As described elsewhere herein, the rigid carrier tray 24 defines a horseshoe-shaped channel.

The partially deformable member 160 is shaped and sized to be received within the horseshoe-shaped channel of the carrier tray 24. The partially deformable member 160 is bitable by a user and is deformed upon such biting to form part of a custom dental impression of the user's teeth.

The partially deformable member 160 has a preformed shape prior to being bit by a user and is deformed upon biting thereof by the user. The partially deformable member 160 can be deformed to conform to an outline of the teeth of the upon being bit.

The partially deformable member 160 is described as being "partially deformable" in that some portions of the partially deformable member 160 are more resistant to deformation than other portions of the partially deformable member 160. It was observed that such differences in deformation properties contributed to better formation of the custom dental impression when used in combination with the thermoformable member 16.

More particularly, the outer sidewalls 164, 168 and the bottom wall 172 of the sidewalls of the partially deformable member 160 surround an interior portion 176 of the partially deformable member 160. The outer sidewalls 164, 168 and the bottom wall 172 are formed of at least a first material and the interior portion 176 is formed of a second material. The first material is more resistant to deformation than the second material.

The at least first material forming the outer sidewalls 164, 168 and the bottom wall 172 can be partially formed of a first silicone and the inner portion 176 can be formed of a second silicone being less rigid than the first silicone. The second silicone material can be a soft gel material.

In one example embodiment, the second silicone material can have a consistency and hardness that is substantially the same as the consistency and hardness of the thermoformable member 16 after being submerged in hot water to become sufficiently pliable. Accordingly, the deformation of the inner portion 176 under a biting force follows the deformation of the thermoformable member 16.

The first silicone material can have a consistency and hardness that is harder than the thermoformable member 16 after being submerged in hot water to become sufficiently pliable. Accordingly, the outer sidewalls 164, 168 and the bottom wall 172 act to restrain the deformation of the inner portion 176 and the thermoformable member 16 under a biting force.

According to an example embodiment, and as illustrated in FIG. 20, the bottom wall 172 includes an outermost layer 180 and an inner layer 184. The inner layer 184 of the bottom wall 172 is formed of the same material as the outer sidewalls 164, 168. The outermost layer 180 is formed of a material that is substantially harder than the first silicone material and the second silicone material. For example, the material forming the outermost layer 180 is substantially resistant to deformation under a biting force by the user. Accordingly, in use, a user biting into the partially deformable member 160 will feel the deformation of the inner portion 176 and the deformation of the outer sidewalls 164, 168 and inner layer 184 of the bottom wall 172. The user will further feel resistance from the outermost layer 180 of the bottom wall 172. This resistance provides a haptic feedback to the user that the user should stop applying the biting force.

Referring now to FIGS. 21 and 22, therein illustrated is a plan view and a side elevation view, respectively, of a carrier tray 24' according to one example embodiment. The carrier tray 24' may be used in place of the rigid generic tray 24 of the dental molding kit 20. The carrier tray 24' has generally of a horseshoe shape. Inner sidewall 188, outer sidewall 192 and bottom sidewall 196 define a horseshoe-shaped channel 200 having a generally U-shaped cross section. The channel 200 is shaped and sized to receive the partially deformable member 160.

In some embodiments, the carrier tray 24' has a handgrip 204 protruding from the carrier tray 24' to assist with handling.

In one example embodiment, and as illustrated, the top rim portion of the outer sidewall 192 includes a horizontal ledge portion 208 extending outwardly from the sidewall 192. The horizontal ledge portion 208 presents a horizontal surface for supporting elements of the dental molding kit 20 during use.

Figure 23:
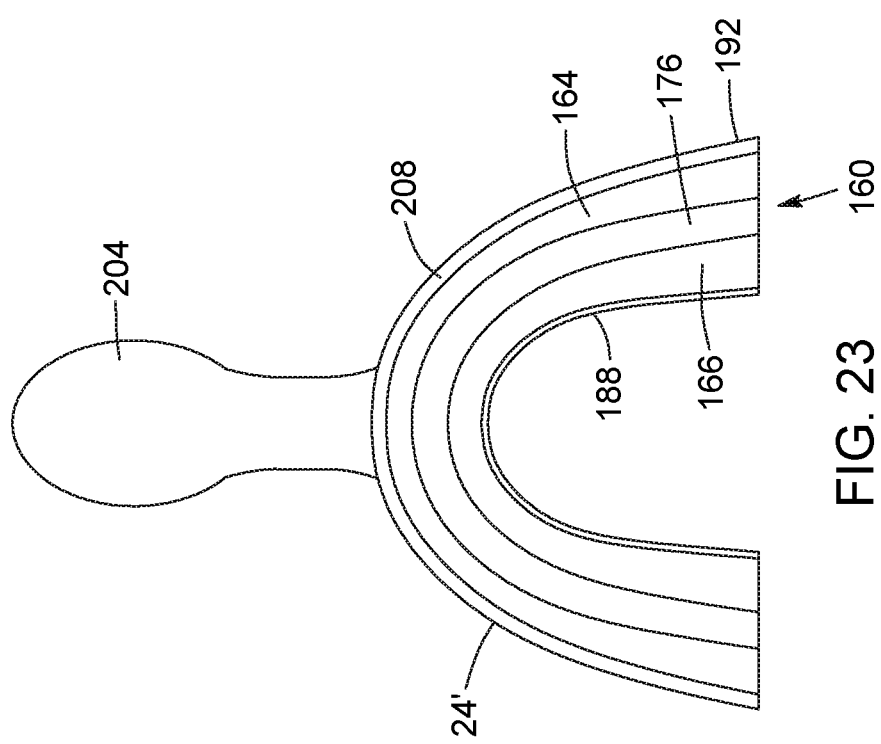
FIG. 23 illustrates a top plan view of the carrier tray having a partially deformable tray received therein.

Referring now to FIG. 23, therein illustrated is a top plan view of the carrier tray 24' with the partially deformable tray 160 appropriately received in the channel 200 thereof.

Figure 24:
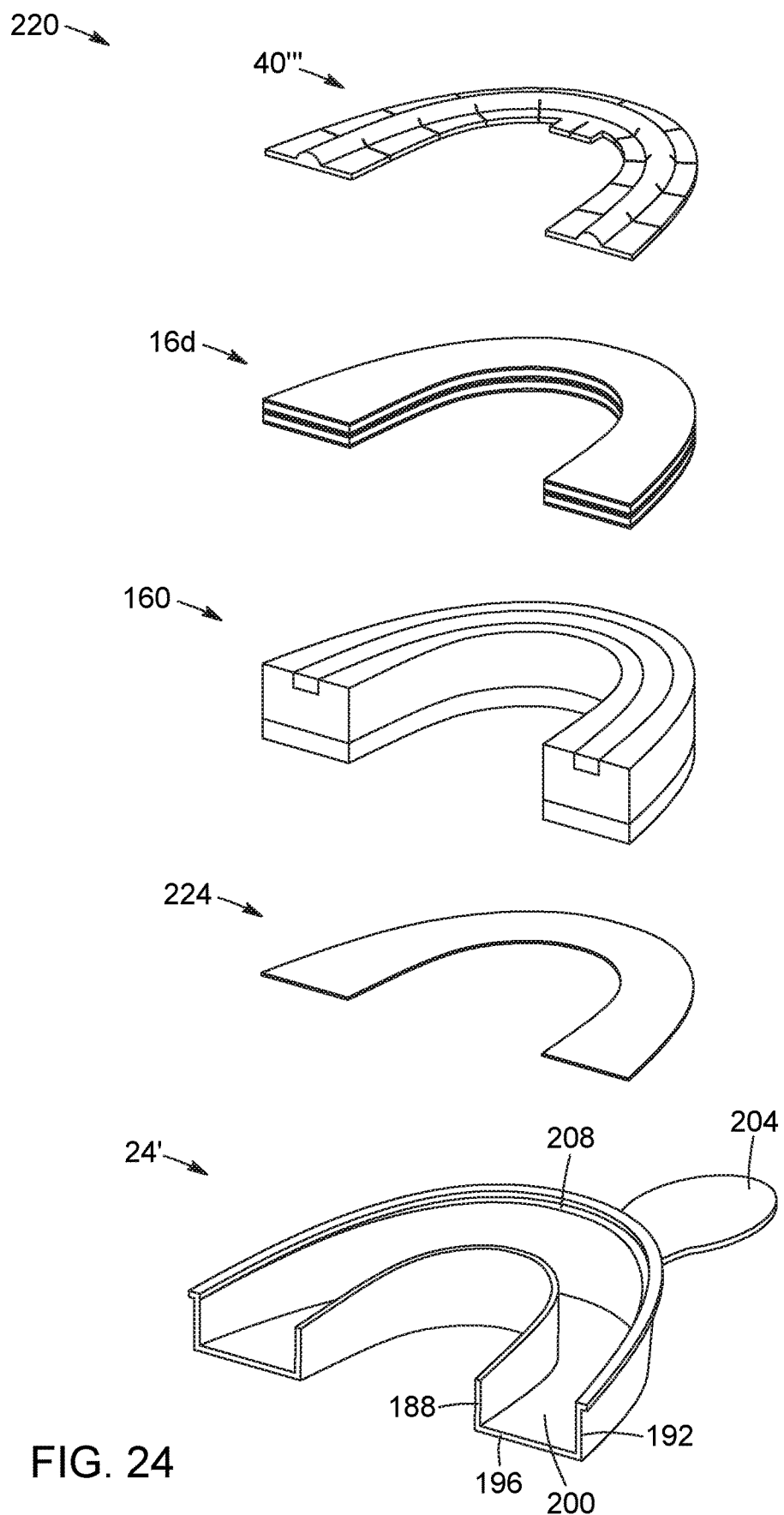
FIG. 24 illustrates an exploded view of the dental tray kit for use for forming a custom dental tray.

Referring now to FIG. 24, therein illustrated is an exploded view of the dental tray kit 220 for use for forming a custom dental tray. The dental tray kit 220 includes the carrier tray 24', a thin plastic sheet 224 to be placed over the carrier tray 24', a partially deformable member 160, a thermoformable member 16*d*, and the spacer member 40'''. The placement of these elements as illustrated in FIG. 24 corresponds to their proper placement during use.

According to a method for using the dental tray kit 224, the carrier tray 24' is provided and the thin plastic sheet 224 is optionally placed over the bottom sidewall 196 of the carrier tray 24'. The thin plastic sheet 224 is used to capture excess from other elements and to reduce or eliminate clean-up of the carrier tray 24'.

The partially deformable member 160 is then placed within the channel 200 of the carrier tray 24'. This corresponds to the configuration illustrated in FIG. 23.

The thermoformable member 16d (or any other thermoformable member described herein according to various example embodiments) is placed over a top surface of the partially deformable member 160. A portion of the thermoformable member 16d may overlap or be supported by the ledge portion 208 of the carrier tray 24'. The thermoformable member 16d may be heated prior to placement, such as by submerging in hot water.

The spacer member 40''' (or any other spacer member described herein according to various example embodiments) is then placed over a top surface of the thermoformable member 16d.

Once all of the elements have been appropriately placed, the user applies a biting forced onto the spacer member 40''', whereby each of the spacer member 40''', the thermoformable member 16d and the partially deformable member 160 are deformed from biting force. The method can include biting the thermoformable material 16 using a pumping action to create the custom dental tray. The pumping action can be produced by the user using an up and down pumping action with the user's teeth until the thermoformable material 16 hardens within the user's mouth.

It will be appreciated that the thermoformable member 16d is deformed to contour the teeth of the user through the spacer member 40'''. The bottom outer surface of the thermoformable member 16d follows the deformation of the partially deformable member 160. When hardened, the thermoformable member 16d forms the custom dental tray for the user. This custom dental tray is separated from other elements of the dental tray molding kit and is usable as a custom dental tray for that user in other dental applications.

It will be appreciated that the dental tray molding kit 220 provides for forming a custom dental tray from application of a single biting action from the user.

It was observed that the less resistant portions (ex: inner portion 176 being formed of the second material) of the partially deformable member 160 deformed more under pressure from the user's teeth that other portions of the partially deformable member 160. Such deformation reduced thinning of the thermoformable member 16d where edges of the teeth would press against the thermoformable member 16d from application of the biting action. Furthermore, the outer sidewalls 164, 168 and bottom wall 172 of the partially deformable member 160, being formed of the more resistant material, caused the thermoformable member 16d to be pressed against the sides of the teeth and the gums of the user to form a closer conformation and better impression. This resistance also provides an indication to the user as to when to stop applying biting pressure.

The single biting action herein refers to a single biting action within the whole of the dental tray molding method using the partially deformable member. Accordingly, a biting action may not need to be applied to the partially deformable member first prior to application of another biting action on the thermoformable member.

However, it will be understood that various methods described herein wherein the custom dental impression is formed from application of separate biting actions to partially deformable member and the thermoformable member, respectively, can also be applied to the dental tray molding kit having the partially deformable member.

Referring now to FIGS. 25 and 26, therein illustrated are a plan view and a side elevation view of a carrier tray 24'' according to an alternative example embodiment. The inner surface of the outer sidewall 192 and inner sidewall 188 have one or more protruding tabs 232 for engaging cooperating recesses of the partially deformable member 160 to hold the member 160 in place. Furthermore, the inner sidewall 188 of the carrier may also have an inner ledge portion 234 for receiving excess flow of thermoplastic material from the thermoformable member during use. A portion 236 of the inner sidewall 188 corresponding to an apex thereof may be elevated, which restricts flow of thermoplastic material at the apex when in use.

Figure 27:
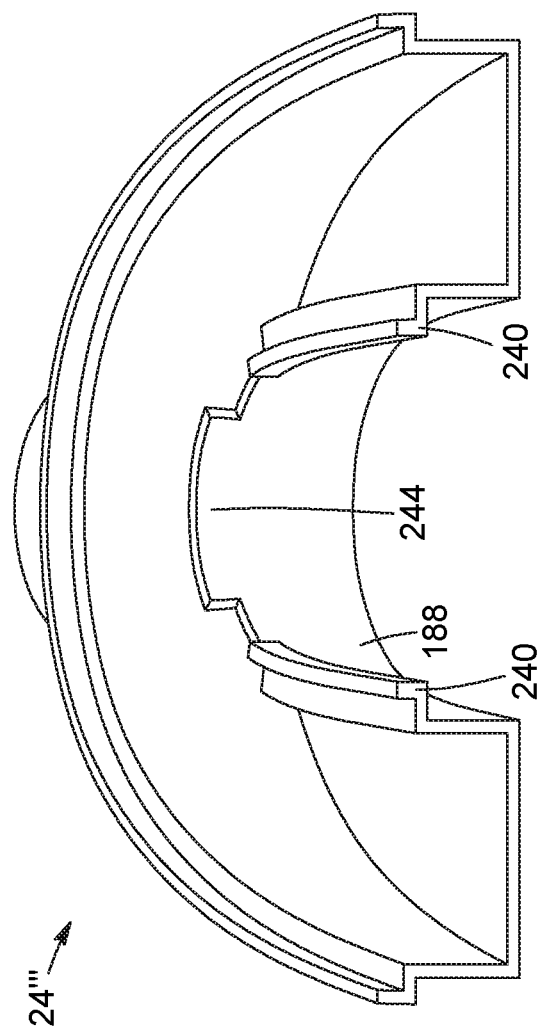
FIG. 27 illustrates a front perspective view of a carrier tray according to yet another alternative example embodiment.

Referring now to FIG. 27, therein illustrated is a front perspective view carrier tray 24''' according to an alternative example embodiment. A top edge of an inner edge of an inner sidewall 188 has an upstanding wall 240 located at end portions of the horseshoe shape. A central portion 244 of the inner sidewall 188 corresponding to an apex of the horseshoe shape is free of the upstanding sidewall 240. The carrier tray 24''' of this example embodiment is intended for use with the thermoformable member 16c illustrated in FIG. 16 and/or the spacer member 40''' having the extending tab 84. The upstanding sidewalls 240 located at the end portions of the horseshoe shape capture thermoplastic material that flow out of the exposed end portions of the thermoformable member 16 (or thermoformable members 16a to 16d). The central portion 244 of the inner sidewall 188 of the carrier tray 24''' is aligned with the central portion 120 of the inner edge 112 of the thermoformable member 16c that is covered by the protective member.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A dental tray molding kit for making a custom dental tray, the kit comprising:
   a generic tray;
   a thermoformable member removably insertable in the generic tray; and
   a deformable spacer member formed of a foam material and placeable onto the thermoformable material and biteable by a user upon placement of the spacer member onto the thermoformable member in a mouth of the user.

2. The dental tray molding kit according to claim 1, wherein the spacer member formed of the foam material is changeable from an ORIGINAL state to a deformed state upon application of a force from teeth of the user and changeable back from the deformed state to the original state after release of the force.

3. The dental tray molding kit according to claim 1, wherein the spacer is reusable.

4. The dental tray molding kit according to claim 1, wherein the thermoformable member has a substantially planar horseshoe shape.

5. The dental tray molding kit according to claim 4, wherein the thermoformable member comprises:
   a thermoplastic sub-member defining a first surface and a second surface opposite the first surface;
   a first protective member covering a first surface of the thermoplastic sub-member; and a second protective member covering a second surface of the thermoplastic sub-member.

6. The dental tray molding kit of claim 1, wherein the generic tray is a rigid carrier tray defining a horseshoe shaped channel; and
wherein the dental tray molding kit further comprises a partially deformable member sized to be received within the horseshoe shaped channel of the rigid carrier tray.

7. The dental tray molding kit according to claim 6, wherein the sidewalls and the bottom wall of the partially deformable member are formed of a first material and wherein an inner portion of the partially deformable member is formed of a second material.

8. The dental tray molding kit according to claim 7, wherein the first material is a silicone having a first rigidity and wherein the second material is a silicone being less rigid than the first material.

9. The dental tray molding kit according to claim 6, wherein the dental tray molding kit comprises a plastic protective member for lining an interior of the channel of the rigid carrier tray.

10. The dental tray molding kit according to claim 6, wherein the partially deformable member and the thermoformable member are bitable in a single biting action by the user to form a custom dental impression of teeth of the user.

11. The dental tray molding kit of claim 1, wherein the deformable spacer member formed of foam material is adapted to introduce air into a space between the user's teeth and the thermoplastic material upon biting by the user onto the deformable spacer member.

12. The dental tray molding kit of claim 11, wherein the air introduced into the space between the user's teeth and the thermoplastic material reduces a suction force pulling the thermoformable member towards the user's teeth.

13. A dental tray molding method comprising:
providing the dental tray molding kit according to claim 1;
submerging the thermoformable member in a recipient of hot water until the thermoformable member is sufficiently pliable;
placing the thermoformable member over the generic tray;
placing a deformable spacer member over the thermoformable member;
applying a biting force from the user onto the thermoformable member through the deformable spacer member;
cooling the thermoformable member within a mouth of the user; and
separating the thermoformable member from the spacer member and the generic tray, whereby the cooled thermoformable member forms a custom dental tray for the user.

14. The dental tray molding kit according to claim 13, wherein the spacer member is formed of a resilient material being changeable from an ORIGINAL state to a deformed state upon applicable of a force from teeth of the user and changeable back from the deformed state to the ORIGINAL state after release of the force.

15. The dental tray molding method of claim 13, wherein the generic tray is a rigid carrier tray defining a horseshoe shaped channel, the method further comprising placing a partially deformable member within the horseshoe shaped channel of the rigid carrier tray; and
wherein the thermoformable member is placed over the partially deformable member.

16. The dental tray molding method of claim 15, wherein the sidewalls and the bottom wall of the partially deformable member are formed of a first material and wherein an inner portion of the partially deformable member is formed of a second material; and
wherein teeth of the user are aligned with the inner portion when applying the biting force.

17. The dental tray molding method of claim 16, wherein the first material is silicone having a first rigidity and wherein the second material is silicone being less rigid than the first material.

18. The dental tray molding method of claim 15, wherein the partially deformable member and the thermoformable member are bitable in a single biting action by the user to form a custom dental impression of teeth of the user.

19. A dental tray molding kit for making a custom dental tray, the kit comprising:
a generic tray;
a thermoformable member removably insertable in the generic tray; and
a deformable spacer member placeable onto the thermoformable material and biteable by a user upon placement of the spacer member onto the thermoformable member in a mouth of the user;
wherein the thermoformable member has a substantially planar horseshoe shape;
wherein the thermoformable member comprises:
a first sub-layer formed of a thermoformable material;
a second sub-layer formed of a thermoformable material;
a first film sub-layer having a first set of slits formed therein; and
a second film sub-layer having a second set of slits formed therein, the second set of slits being offset from the first set of slits;
wherein the first and second film sublayers are sandwiched between the first and second thermoformable sublayers.

20. The dental tray molding kit according to claim 19, wherein the first protective member and the second protective member are substantially resistant to piercing from application of a biting force from teeth of the user.

21. The dental tray molding kit according to claim 20, wherein the first protective member is a plastic film member and the second protective member is a plastic film member.

* * * * *